United States Patent [19]

Mayr et al.

[11] 3,792,920

[45] Feb. 19, 1974

[54] AUTOMATIC FILM TRANSPORT STOPPING ARRANGEMENT IN A MOTION PICTURE CAMERA

[75] Inventors: Helmut Mayr, Taufkirchen; Theodor Huber; Richard Pelje, both of Munich, all of Germany

[73] Assignee: Afga-Gevaert AG, Leverkusen, Germany

[22] Filed: Sept. 25, 1972

[21] Appl. No.: 291,607

[30] Foreign Application Priority Data
Sept. 24, 1971 Germany............................ 2147680

[52] U.S. Cl................................... 352/91, 352/141
[51] Int. Cl. ........................................... G03b 21/36
[58] Field of Search............................. 352/91, 141

[56] References Cited
UNITED STATES PATENTS

| | | | |
|---|---|---|---|
| 3,701,594 | 10/1972 | Keiner................................... | 352/91 |
| 3,419,325 | 12/1968 | Mayr et al. ............................ | 352/91 |
| 3,623,989 | 11/1971 | Mayr et al. ............................ | 352/91 |
| 3,672,753 | 6/1972 | Nobusawa.............................. | 352/91 |

Primary Examiner—Samuel S. Matthews
Assistant Examiner—Russell E. Adams, Jr.
Attorney, Agent, or Firm—Michael S. Striker

[57] ABSTRACT

The timing circuit timing the fade in and fade out has an emitter resistor, the voltage across which, when exceeding a predetermined magnitude switches a subsequent threshold circuit means from a first to a second stable state. The change in state in turn is used to de-energize the film transport motor.

8 Claims, 1 Drawing Figure

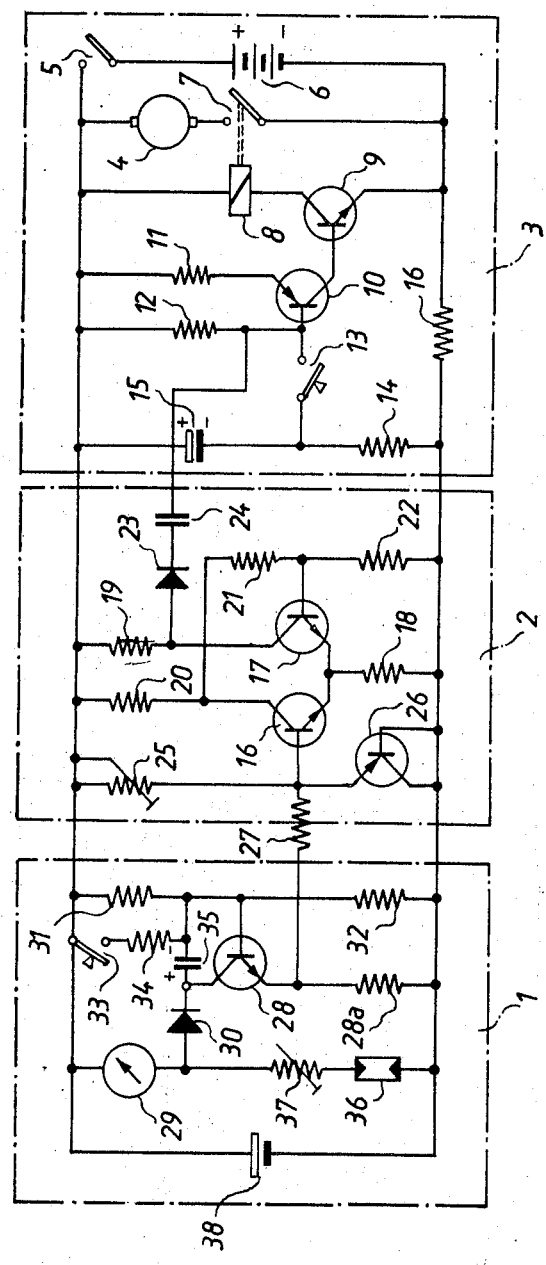

3,792,920

AUTOMATIC FILM TRANSPORT STOPPING ARRANGEMENT IN A MOTION PICTURE CAMERA

BACKGROUND OF THE INVENTION

The present invention relates to motion picture cameras having an electromotor for driving the camera gearing, that is the film transport. In conventional motion picture cameras of this type, the motor energizing circuit is completed when a relay in an electronic amplifier circuit is energized, closing the contacts between the motor and the battery supplying said motor. Conventional cameras also have aperture control circuits wherein the opening of the aperture is controlled by a light-sensitive element to a value corresponding to the available light. Further, the aperture control circuits in the conventional cameras also have timing circuits which time the opening and the closing of the aperture.

In some known motion picture cameras, the shutter opening and closing processes may be viewed in the viewfinder. This is accomplished by means of a scale in front of which a pointer moves to indicate the aperture opening.

However in cameras which do not have such an indicator, it is impossible to tell whether the fade in and fade out, that is the opening and closing of the aperture has been completed or not. Thus the user of the camera will only operate the motor circuit after a time interval which assures that the particular fade out operation, for example, has been completed. This has the disadvantage that the motor will continue to transport the film even though the diaphragm has closed. Thus a good possibility exists that lengthy sections of film will remain unexposed.

SUMMARY OF THE INVENTION

It is an object of the present invention to furnish an arrangement stopping the motor upon closure of the aperture thereby preventing the waste of film mentioned above.

The present invention thus resides in a motion picture camera having an aperture and film transport means. It comprises electromotor means for driving said film transport means and motor driving circuit means for energizing said electromotor means in response to a drive signal and de-energizing said electromotor means in response to a stop signal. The motion picture camera also has aperture control circuit means closing said aperture upon receipt of an externally applied closure signal. The aperture control circuit means include timing means furnishing a predetermined timing signal when the aperture is closed. Additional circuit means are then interconnected between said timing circuit means and said motor driving circuit means furnishing said stop signal in response to said predetermined timing signal.

Thus it is seen that, in accordance with the present invention, the energization of the electromotor is automatically interrupted following aperture closure.

In a preferred embodiment of the present invention, the additional circuit means comprise bi-stable circuit means which switch from a first to a second state upon receipt of said predetermined timing signal. Differentiating circuit means are connected to the output of the bi-stable circuit means. These differentiating circuit means furnish a trigger signal to the electronic amplifier controlling motor energization upon said change of state.

In a preferred embodiment of the present invention, the timing circuit means comprise a timing transistor and a emitter resistor connected to the emitter of said timing transistor. A timing capacitor is connected from the base to the collector of said timing transistor. The voltage across said emitter resistor is the timing signal which, when it reaches a predetermined amplitude indicative of aperture closing, causes the above-mentioned change in state of said Schmitt trigger.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The single FIGURE shows a circuit arrangement in accordance with the present invention.

DESCRIPTION OF THE PREFERRED EMBODIMENT

A preferred embodiment of the present invention will now be described with reference to the drawing.

In the FIGURE, the aperture control circuit means are denoted by reference numeral 1. Reference numeral 2 denotes the additional circuit means, here a Schmitt trigger, while reference numeral 3 refers to the electromotor 4 and its associated motor driving circuit. The electromotor 4 is a DC motor one of whose terminals is connected to a battery 6 via an operating switch 5, while the other terminal is connected to the negative side of battery 6 via relay contact 7 controlled by relay 8. The coil of relay 8 is connected in the collector circuit of a transistor 9 whose base is connected to the collector of a transistor 10. Transistors 9 and 10 are of opposite conductivity. An emitter resistor 11 is connected to the emitter of transistor 10. The emitter of transistor 9 is directly connected to the negative side of the battery. A resistor 12 is connected in parallel with resistor 11 and the emitter-base circuit of transistor 10. Resistor 12 is part of a voltage divider whose second resistor, 14, may be connected thereto through a switch 13. Closure of switch 13 further connects a capacitor 15 in parallel with resistor 12. A resistor 16 a connected between resistor 14 and the emitter of transistor 9 is a protective resistor which will be discussed later.

The additional circuit means, namely Schmitt trigger 2, comprise two resistors 16 and 17 in whose common emitter circuit a resistor 18 is arranged. The collector circuit of transistor 17 has a resistor 19, while the collector circuit of transistor 16 has a resistor 20. The collector of transistor 16 is connected to the base of transistor 17 by means of a resistor 21. A resistor 22 is connected between the base of transistor 17 and the negative side of the battery. The collector of transistor 17 is connected to a dial 23 and a capacitor 24 to the base of transistor 10.

The base of transistor 16 is connected to a voltage divider comprising a variable resistor 25 and the collector-emitter circuit of a transistor 26. Transistor 26 is fully conductive, thereby furnishing a constant voltage. The base of transistor 26 is directly connected to the collector thereof.

Schmitt trigger 2 is connected to the aperture control circuit means through a resistor 27. Resistor 27 is connected to the emitter of a transistor 28, herein referred to as timing transistor means. The emitter of transistor 28 is connected to the negative side of the battery through an emitter resistor 28a. A rotating coil type of instrument 29 as well as a diode 30 are connected in the emitter circuit of transistor 28. The base voltage is furnished by a voltage divider comprising a resistor 31 and a resistor 32. The value at the common point of resistors 31 and 32 are so chosen that transistor 28 is blocked. The fade out process in the camera, namely the closing of the aperture, is started by means of a switch 33, herein referred to as closure signal furnishing means which, when closed, connect a resistor 34 in parallel with resistor 31. Timing capacitor means, here a capacitor 35, is connected between the base and collector of transistor 28.

Connected in series with a rotating coil instrument 29 is a photo-resistor 36, one embodiment of photo-sensitive means, and an adjustable resistor 37. The series circuit comprising the diode 30, the collector-emitter circuit of transistor 28 and the resistor 28a is connected in parallel to resistor 37 and photo-resistor 36.

The aperture control circuit means 1 as well as Schmitt trigger 2 are energized by means of a stabilyt cell 38, which is a voltage regulator cell furnishing a substantially constant voltage. Cell 38 is connected to battery 6 through a protective resistor 16a which has been described above.

The above-described arrangement functions as follows:

When the camera is first put into operation, switch 5 is closed. This causes a current to flow through measuring instrument 29 which is proportional to the ambient light conditions. The diaphragm is adjusted in correspondence to the position of the rotating coil of instrument 29. Since transistor 28 is blocked, the current through the instrument 29, which determines the aperture opening, depends solely on the resistance values of variable resistor 37 and photoresistor 36.

Activation of release switch 13 by the operator of the camera causes the capacitor 15, which has previously been charged to the full voltage of battery 6, to discharge through resistor 12. This current pulse through 12 causes transistor 10 to become conductive, allowing base-emitter current to flow through transistor 9, thereby causing said transistor to become conductive also. The current flowing through the emitter-collector circuit of transistor 9 at this time is sufficiently large to cause the relay 8 to pull in, closing contacts 7, thereby energizing the motor. Capacitor 15 continues to discharge until it reaches the voltage determined by the voltage divider ratio of resistors 12 and 14. At this point, transistor 9 is still sufficiently conductive to furnish a holding current to relay 8, thereby containing contacts 7 in the closed position.

When a fade out is desired, a switch 33 is closed. Resistor 34 is then in parallel with resistor 31. The voltage at the base of transistor 28 therefore becomes more positive and transistor 28 begins to conduct. At this point, capacitor 35 starts to discharge through the emitter-collector circuit of transistor 28 and through resistors 28a and 32. Diode 30 prevents any discharge current of capacitor 35 from flowing through the circuit of measuring instrument 29. The discharge of capacitor 35 causes transistor 28 to become more and more conductive. Thus the current orginally flowing through the measuring instrument 28 has superimposed thereupon a continuously increasing current through diode 30, the emitter-collector circuit of transistor 28 and emitter resistor 28a. This increase in current causes the aperture to close slowly (fade out). The increase in current through the instrument 29 causes the collector of transistor 28 to assume a more negative potential, which potential change is transmitted to the base of transistor 28 through capacitor 35. This causes the transistor to become conductive at a slower rate than would otherwise occur.

It is seen that while capacitor 35 discharges, the current through resistor 28a increases, thereby causing the voltage across said resistor to increase continually. Reference to the figure shows that the voltage across resistor 28a is transmitted to the base of transistor 16. At the end of the fade out, the voltage across resistor 28a has a magnitude sufficient to cause transistor 16 to become conductive. This magnitude of voltage across resistor 28a is herein referred to as the predetermined timing signal. When transistor 16 becomes conductive, the voltage at its collector decreases, causing a corresponding decrease of voltage at the base of transistor 17. Transistor 17, which was previously conductive, now starts to block, decreasing the current through its emitter-collector circuit. This in turn decreases the voltage drop across resistor 18, causing transistor 16 to become even more conductive. Thus Schmitt trigger 16 rapidly changes from a state wherein transistor 17 was conductive and transistor 16 blocked to a second state, wherein transistor 16 is conductive and transistor 17 is blocked. This occurs upon application of the predetermined timing signal to the base of transistor 16. Blocking of transistor 17 causes a rapid, positive change in voltage at its collector. This change in collector voltage is differentiated by means of capacitor 24 and resistor 12, thereby causing a large positive pulse to be applied to the base of transistor 10. This causes transistor 10 to block, in turn causing transistor 9 to block and the current through relay coil 8 to be interrupted. This causes an opening of contacts 7 and a de-energization of motor 4.

When switch 33 is again opened, capacitor 35 recharges through measuring instrument 29, diode 30, and resistor 32. After a time interval determined by the time constant of discharging circuit, the base of transistor 28 is again sufficiently negative to cause it to block. The aperture is then again opened to a value depending upon the surrounding light conditions only.

During the opening of the aperture, transistor 16, which was conductive following receipt of the predetermined timing signal, is again blocked. This causes transistor 17 to become conductive again, causing a large negative jump of voltage at its collector. The negative jump does not influence transistor 10, since it is blocked by diode 23.

Renewed operation of the motor only commences when switch 13 is opened and then again closed.

While the invention has been illustrated and described as embodied in a specific inter-connection between the timing circuit and the motor control circuit, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. In a motion picture camera having film transport means and diaphragm means having an aperture, an arrangement for automatically stopping said film transport at the end of a fade-out, comprising, in combination, electromotor means for driving said film transport means; motor driving circuit means connected to said electromotor means for energizing said electromotor means in response to a drive signal and for deenergizing said electromotor means in response to a stop signal; aperture control circuit means for closing said aperture upon receipt of a closure signal, said aperture control circuit means having timing circuit means operative only during said closing of said aperture for furnishing a predetermined timing signal when said aperture is first fully closed; closure signal furnishing means for furnishing said closure signal upon external activation; and additional circuit means interconnected between said timing circuit means and said motor driving circuit means, for furnishing said stop signal to said motor driving means substantially instantaneously in response to said predetermined timing signal.

2. An arrangement as set forth in claim 1 further comprising battery means; and wherein said motor driving circuit means comprise electronic amplifier means having an output, and relay means connected to said output, said relay means having relay contacts connecting said electromotor means to said battery means when closed.

3. An arrangement as set forth in claim 1, wherein said predetermined timing signal is a timing signal having a predetermined amplitude; and wherein said additional circuit means comprise a threshold circuit means having a threshold corresponding to said predetermined amplitude.

4. An arrangement as set forth in claim 3, wherein said threshold circuit means comprise bi-stable circuit means switching from a first to a second stable stage in response to said timing signal having said predetermined amplitude.

5. An arrangement as set forth in claim 4, further comprising differentiating circuit means interconnected between said bi-stable circuit means and said motor driving circuit means, for furnishing said stop signal to said motor driving circuit means when said bi-stable circuit means switches from said first to said second stable state.

6. An arrangement as set forth in claim 5, further comprising rectifier means connected between said bistable circuit means and said differentiating circuit means.

7. An arrangement as set forth in claim 6, wherein said bi-stable circuit means are Schmitt trigger circuit means.

8. An arrangement as set forth in claim 7, wherein said timing circuit means comprise timing transistor means having an emitter-collector circuit and a base; emitter resistor means connected in said emitter-collector circuit; and timing capacitor means connected between said emitter-collector circuit and said base, the voltage across said emitter resistor means constituting said timing signal.

* * * * *